United States Patent [19]

Bertrand

[11] Patent Number: 5,230,270

[45] Date of Patent: Jul. 27, 1993

[54] MACHINE FOR CUTTING CONCRETE BARRIERS

[76] Inventor: René Bertrand, 760 Rossiter, St Jean sur Richelieu Quebec, Canada, J3B 8J1

[21] Appl. No.: 852,806

[22] Filed: Mar. 17, 1992

[30] Foreign Application Priority Data

Feb. 14, 1992 [CA] Canada .................................. 2061275

[51] Int. Cl.⁵ ........................... B28D 1/04; B28D 1/12
[52] U.S. Cl. ........................................ 83/489; 83/928; 30/379.5; 125/14
[58] Field of Search ..................... 125/12, 13.01, 13.03, 125/14; 83/928; 30/379, 379.5; 299/15, 39, 41, 72, 73, 75, 76; 404/90

[56] References Cited

U.S. PATENT DOCUMENTS

| | | | |
|---|---|---|---|
| 2,815,048 | 12/1957 | Davis | 30/379 |
| 3,785,705 | 1/1974 | Binger et al. | 83/928 X |
| 4,230,372 | 10/1980 | Marten | 299/15 |
| 4,353,275 | 10/1982 | Colville | 30/379 X |
| 4,357,120 | 11/1982 | MacDonald | 83/928 X |
| 4,433,871 | 2/1984 | Bertrand | 30/379.5 X |
| 4,792,190 | 12/1988 | Bertrand | 83/928 X |
| 4,832,412 | 5/1989 | Bertrand | 30/379 X |
| 5,044,696 | 9/1991 | Blackhurst | 125/14 X |
| 5,135,287 | 8/1992 | Karnes | 125/13.03 X |

Primary Examiner—Bruce M. Kisliuk
Assistant Examiner—Bryan S. Reichenbach
Attorney, Agent, or Firm—Robic

[57] ABSTRACT

A machine for cutting concrete blocks especially continuously molded, highway dividing barriers of the New Jersey type, in a very fast and easy manner. The machine is mounted on a support base forming part of a powered truck-like vehicle and includes a primary extensible boom that is mounted on the support base so as to extend horizontally laterally thereof and be adjustably tiltable about its longitudinal axis. The machine also includes a secondary extensible boom that is mounted on the extensible end of the primary boom. Both of these booms extend in a same plane, and the secondary boom is downwardly tiltable about an axis transversal to both of the primary and secondary booms. A rotary, concrete-cutting saw assembly is mounted at the bottom end of the secondary boom. This assembly includes a saw blade that extends parallel to the plane in which said primary and secondary booms extend. Advantageously, the lateral orientation of the primary boom with respect to the front-to-rear axis of the vehicle may also be made adjustable.

15 Claims, 8 Drawing Sheets

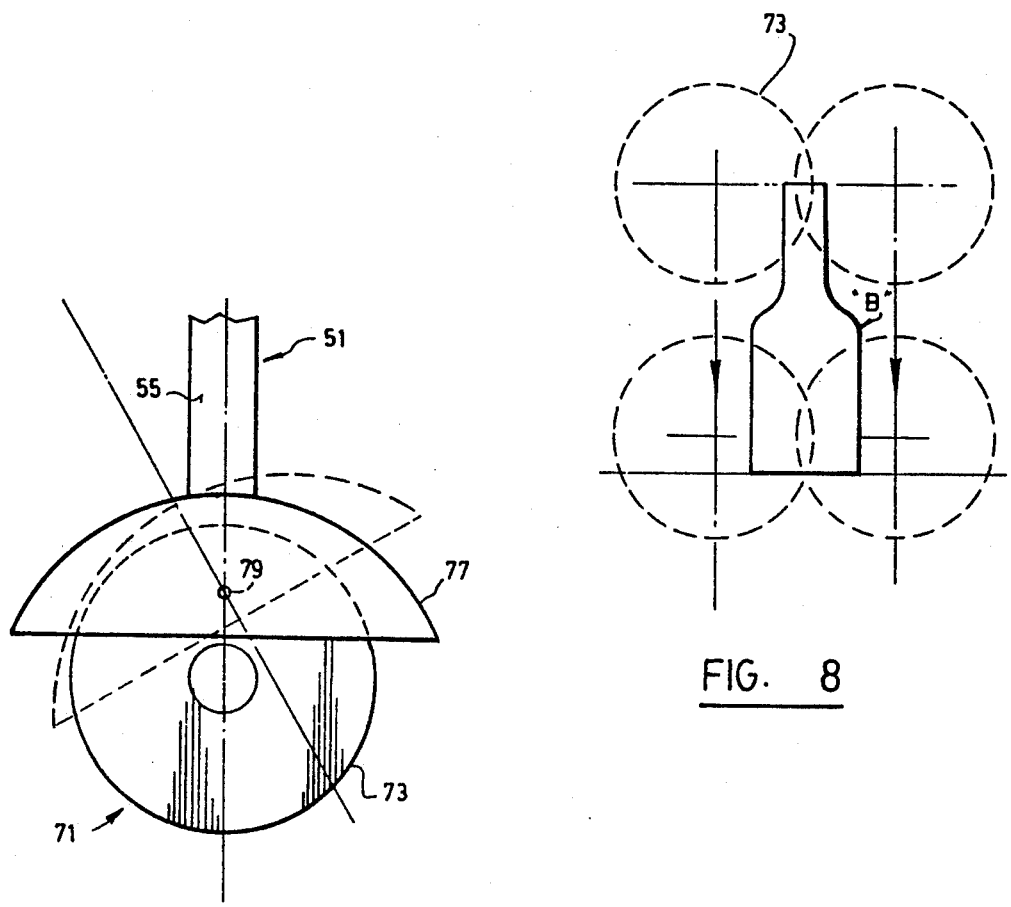
FIG. 8
FIG. 9
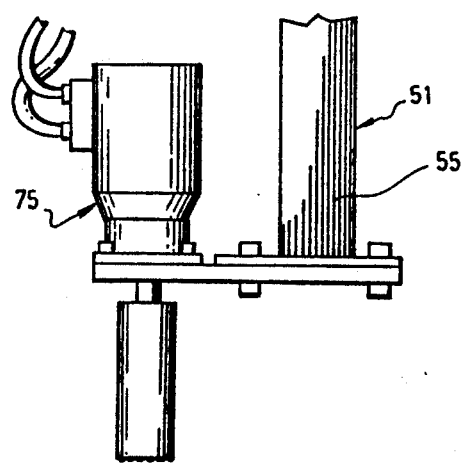
FIG. 10

MACHINE FOR CUTTING CONCRETE BARRIERS

BACKGROUND OF THE INVENTION a) Field of the Invention

The present invention is concerned with a machine for cutting concrete blocks, especially continuously molded, highway dividing barriers of the New Jersey type, although the invention must not be interpreted as being restricted to the cutting of such barriers exclusively.

b) Brief Description of the Prior Art

It is of common practice to use barriers in the form of elongated blocks of concrete to divide the ways that are in opposite directions in highways, especially urban highways. It is also of common practice to use such blocks on one or both sides of roads or highways, in order to delimit the same.

It has recently been suggested to mold such highway dividing barriers in situ, the resulting barrier in the form of continuous elongated block of concrete of constant cross-section.

Because of the climatic conditions especially in countries like Canada and the Northern part of the United States that may undergo substantial temperature changes, it is necessary to cut the continuous barriers at given intervals after they have been molded in situ in order to form expansion joints. This must of course be done as fast as possible, especially in busy highways, in order to reduce as much as possible traffic jams.

SUMMARY OF THE INVENTION

The object of the invention is to provide a machine for cutting concrete blocks, especially highway dividing barriers, which permits to cut the blocks according to a wide variety of angles in a very speady and efficient manner, thereby reducing to the lowest extent the risk of traffic jams when the block to be cut is a barrier of a busy highway.

More particularly, the invention provides a machine for cutting concrete blocks, especially continuously molded, highway dividing barriers of the New Jersey type. This machine is mounted on a support base forming part of a powered truck-like vehicle having a front-to-rear axis and comprises:

a) a primary lengthwise-extensible boom having a longitudinal axis and an extensible end;

b) first mounting means for mounting the primary boom on the support base for the boom to extend horizontally laterally thereof, the first mounting means including means for adjustably tilting the primary boom about its longitudinal axis whenever desired;

c) a secondary lengthwise-extensible boom having an extensible boom end;

d) second mounting means for mounting the secondary boom on the extensible end of the primary boom so that the primary and secondary booms extend in a same plane and the secondary boom is downwardly oriented and has its bottom end extensible downwardly, the second mounting means including means for adjustably tilting the secondary boom within the above plane about an axis transversal to both of the primary and secondary booms; and e) a rotary, concrete-cutting saw assembly mounted at the bottom end of the secondary boom, this assembly including a saw blade extending in another plane parallel to the plane in which the primary and secondary booms extend.

Advantageously, the first mounting means may also include means for adjusting the lateral orientation of the primary boom with respect to the front-to-rear axis of the vehicle.

Moreover, the saw assembly may be made detachable and replaceable by a drill assembly whenever required.

As can be appreciated, the machine according to the invention is part of a vehicle that can be moved along the blocks or barriers to be cut.

The machine comprises a saw assembly including a rotary saw blade that extends in a plane that is transversal to the front-to-rear axis of the vehicle. This saw blade may be moved laterally away from the vehicle toward the barriers to be cut by actuation of the primary boom and then downwardly toward the barrier to cut the same, by actuation of the secondary boom.

The saw blade may be tilted at angle either in the transversal plane in which it extends or with respect to a vertical plane, in order, for example, to cut at angle the end of the barrier. The saw may also be vertically oriented at angle with respect to he front to rear axis of the vehicle, to make vertical cuts at angle in the barrier whenever desired.

Therefore, the saw blade has several degrees of freedom that makes it easily adaptable to any kind of barrier. Moreover, it can be positioned and operated in a very fast manner from the vehicle, thereby making the cutting operation rather short in time.

The invention and its advantages will be better understood upon reading of the following non restrictive description of a preferred embodiment thereof given with reference to the accompanying drawings.

BRIEF DESCRIPTION OF THE DRAWINGS

FIG. 8 is a schematic view showing how a New Jersey barrier may be cut with the machine according to the invention;

FIG. 9 is an elevational view of the saw-blade protective hood showing it in two different positions; and FIG. 10 is an elevational view of the bottom end of the secondary boom provided with a core drilling assembly in replacement of the saw assembly.

DESCRIPTION OF A PREFERRED EMBODIMENT

The machine "M" for cutting concrete blocks according to the invention as shown in the accompanying drawings, is particularly well adapted for cutting continuously molded, highway dividing barriers "B" of the New Jersey type, although it can be used for cutting other kind of concrete blocks.

Figure 1:
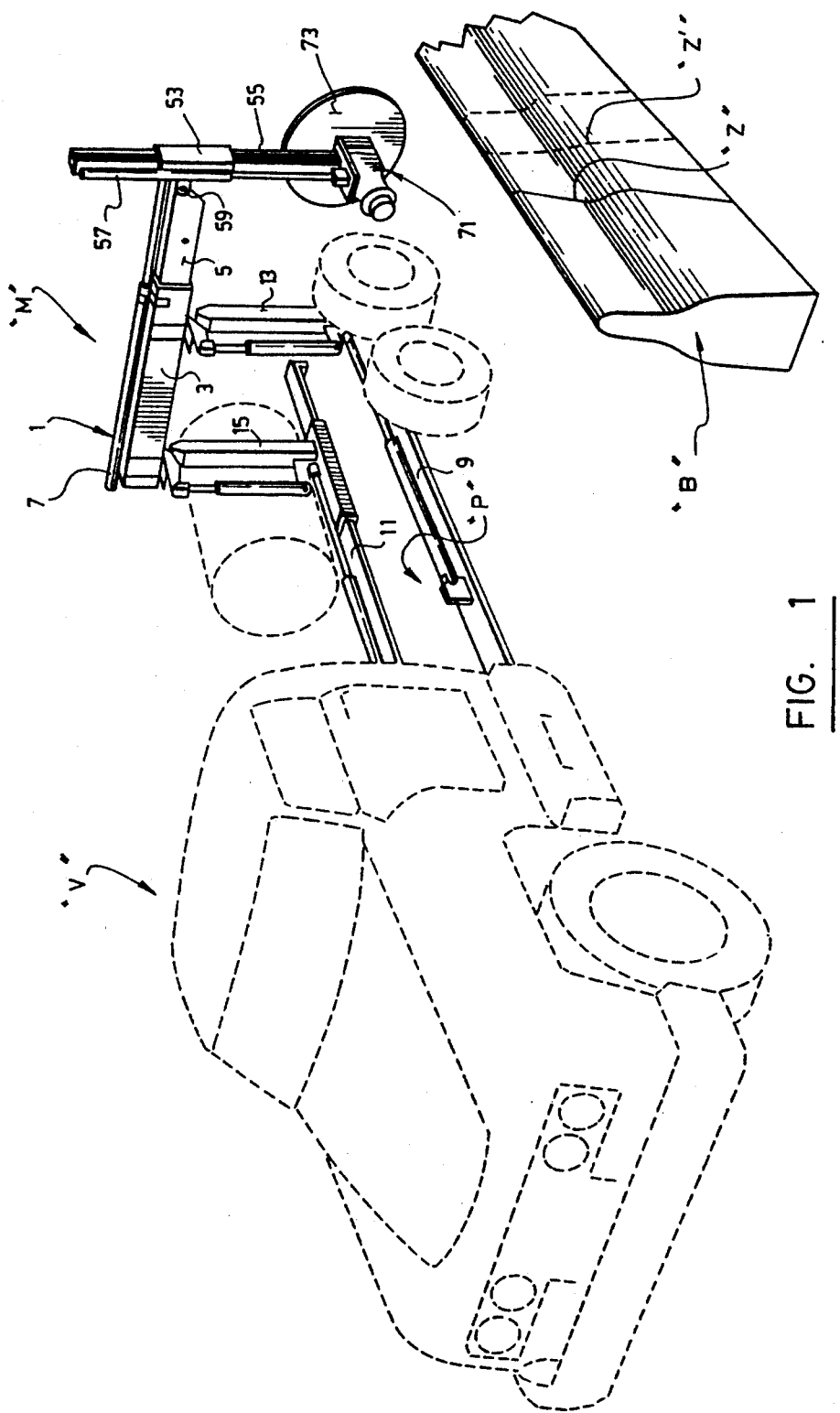
FIG. 1 a perspective view of a machine for cutting concrete blocks according to the invention, mounted on the rear platform of a truck.

As shown in FIG. 1, the machine "M" is mounted on the rear platform "P" of a powered truck-like vehicle "V", the platform "P" acting as a support base for the machine. Of course, one may understand that other kind of support bases could be used without departing from the scope of the present invention.

The machine "M" comprises a primary lengthwise-extensible boom 1 having a longitudinal axis and an extensible end, which is mounted on the support base "P" in such a manner that the boom 1 extends horizontally laterally thereof.

The primary boom 1 is telescopic and comprises a sleeve-shaped outer member 3, an elongated inner member 5 slidably mounted within the outer member 3 and a power jack having one end attached to the inner member 5 and another end attached to the outer member 3. Of course, the power jack 7 is used to move the inner member within the outer member in any required position.

First mounting means are provided for mounting the primary boom 1 onto the support base "P". As better shown in FIG. 2, these first mounting means comprise a pair of guiding rails 9, 11 rigidly fixed to the base support P, these rails hereinafter called first and second rails, being spaced apart and extending parallel to the front-to-rear axis of the vehicle.

First and second primary boom carriers 13, 15 are slidably mounted onto the first and second rails 9, 11, respectively. These first and second carriers 13, 15 are each in the form of a vertical post having a foot member 17 or 19 slidably mounted onto the corresponding rail.

First and second driving means each consisting of a power jack 21, 23 are used to move the first and second carriers 13, 15 independently from each other along the first and second rails 9, 11.

Figure 7:
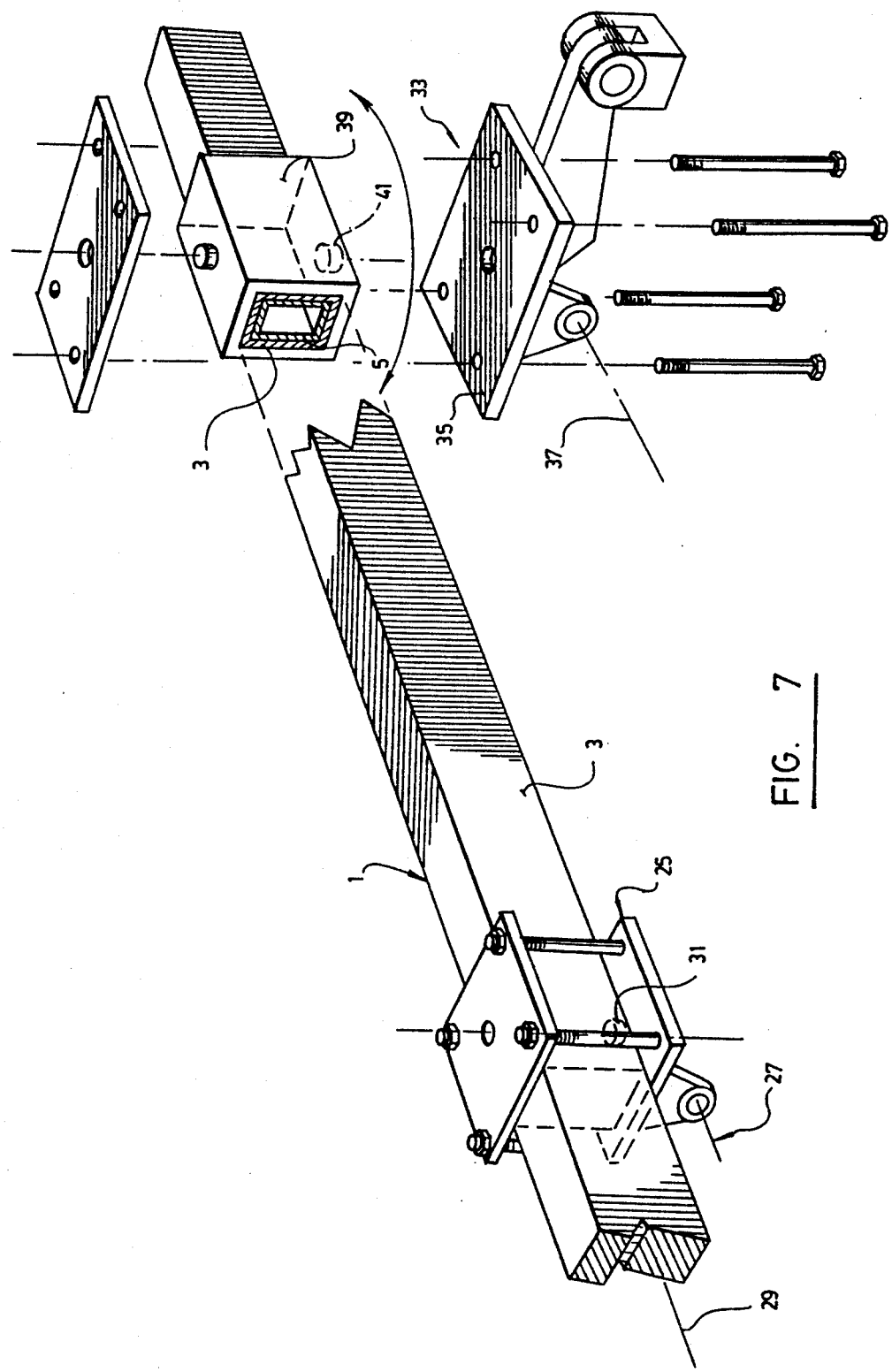
FIG. 7 is an exploded perspective view showing the way the primary boom is connected to its supporting posts.

The primary boom 1 is connected on top of the first carrier 13 by means of a connecting member that is 25 better shown in FIG. 7 and is pivotably mounted on top of the first carrier 13 about an axis 27 parallel to the longitudinal axis 29 of the primary boom 1. The connecting member 25 is also pivotably connected to the outer member 3 of the primary boom 1 by means of a short pin 31 that extends perpendicular to the longitudinal axis 29.

The primary boom 1 is connected on top of the second carrier 15 by means of a holding member 33 including a base member 35 pivotably mounted on top of the second carrier 13 about an axis 37 parallel to the longitudinal axis 29 of the boom 1. The holding member also includes a sleeve member 39 in which the primary boom 1 is slidably mounted. This sleeve member 39 is pivotably connected to the base member 35 by means of a short pin 41 perpendicular thereto and to the primary boom 1.

Power jacks 43, 45 are mounted on the carriers 13, 15 to tilt the connecting and holding members 25, 27 together with the primary boom 1 about the axes 27, 37 parallel to the longitudinal axis 29.

Figure 2:
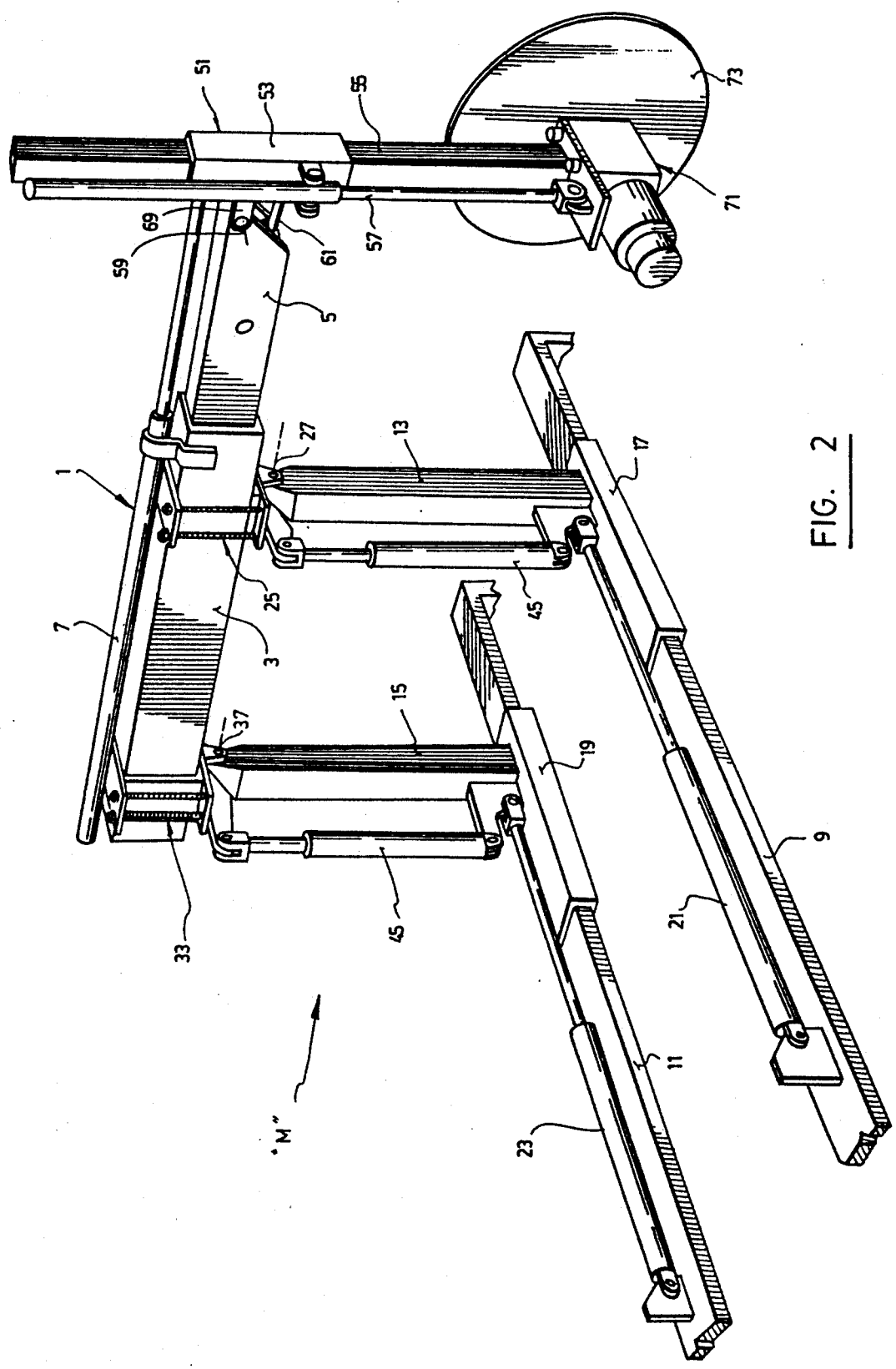
FIG. 2 is an enlarged perspective view of the machine shown in FIG. 1.
Figure 5:
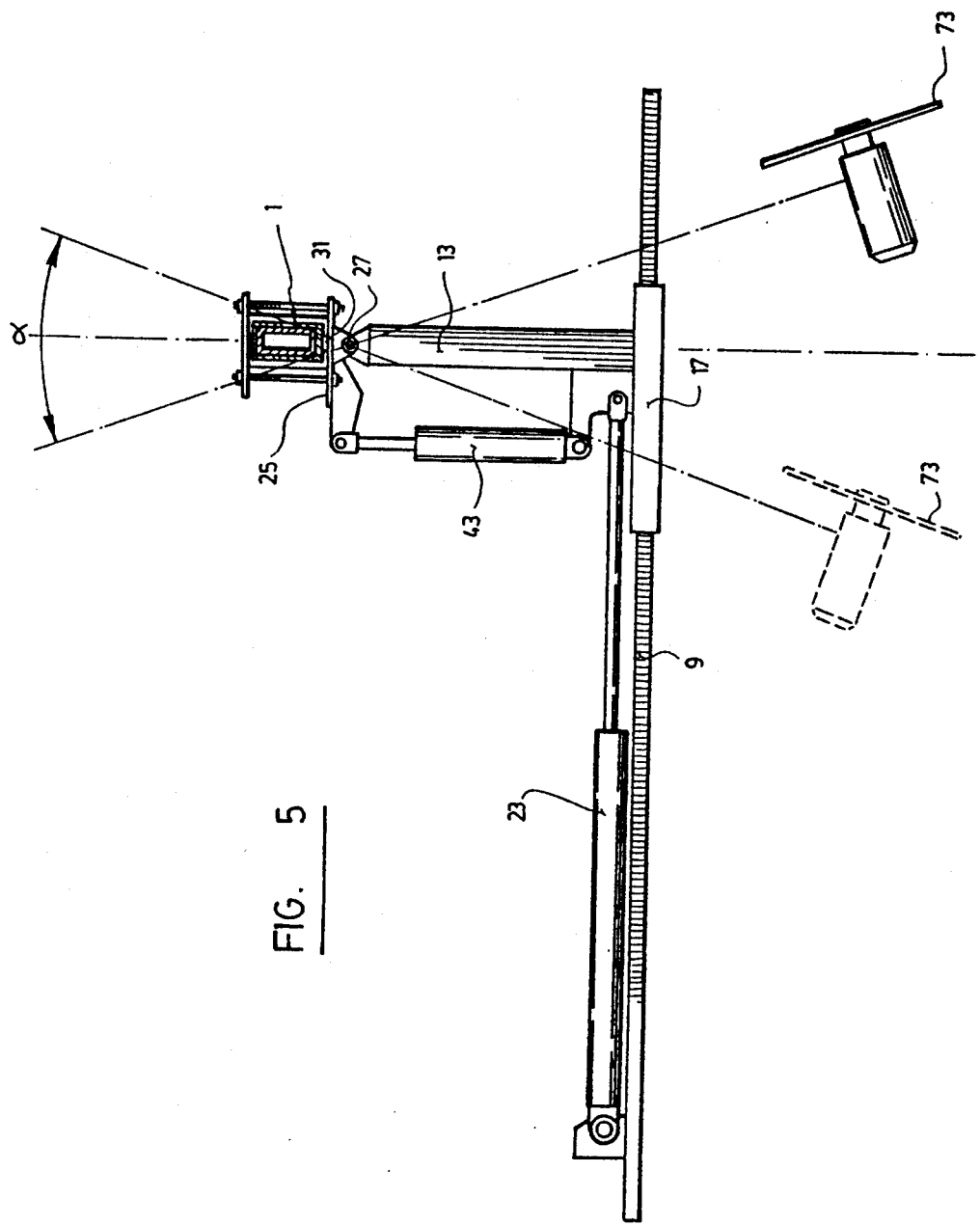
FIG. 5 is a side elevational view of the machine, showing how the primary boom shown in cross-section may be tilted.

As shown in FIGS. 2 and 5, the power jacks 43, 45 extend from the foot members 17, 19 up to the connecting and holding members 25, 33 and have a stroke selected to adjustably tilt the primary boom at an angle $\alpha$ that may be as high as 25° in both directions about the longitudinal axis 29.

Thus, the first mounting means may be said to include means for adjustably tilting the primary boom 1 about its longitudinal axis 29.

Figure 3:
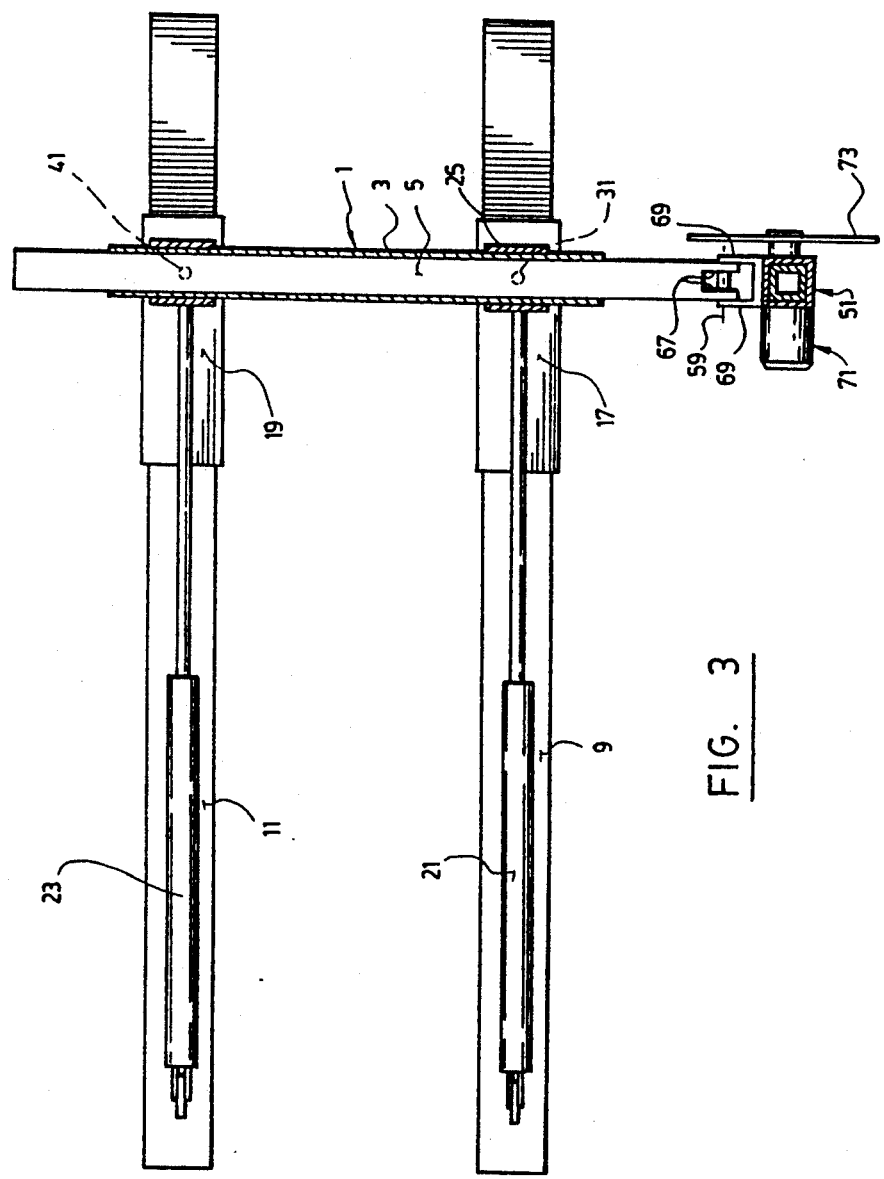
FIG. 3 is a top plan view of the machine, with the primary boom shown in cross-section and extending perpendicular to the front-to-rear axis of the truck.
Figure 4:
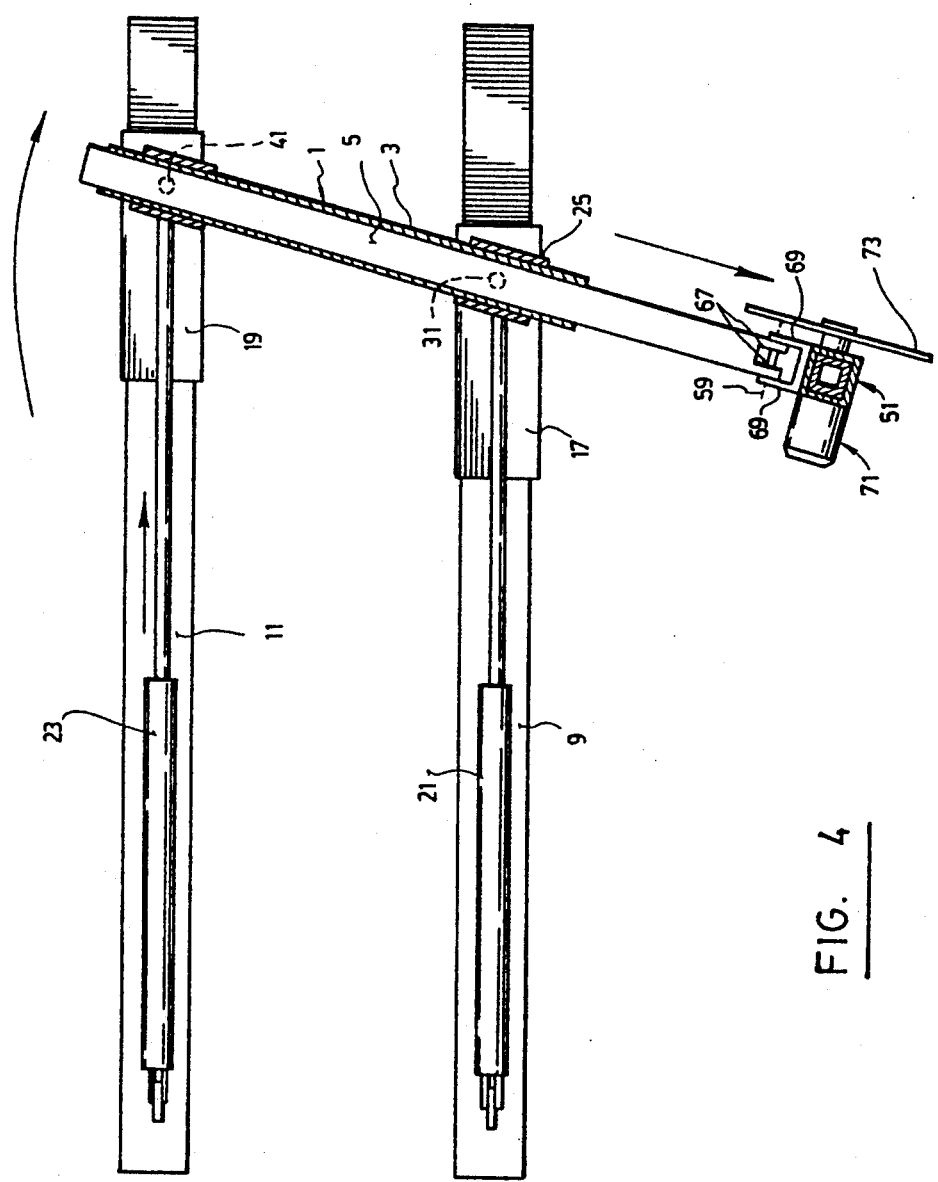
FIG. 4 is a top plan view of the machine, with the primary boom shown in cross-section and extending at angle with respect to the front-to-rear axis of the truck.

As also shown in FIGS. 3 and 4, proper adjustment of the foot members 17, 19 of the first and second carriers along the first and second rails 9, 11 by proper actuation of the first and second power jacks 21, 23 respectively, causes the primary boom 1 connected to the connecting member 25 to be slid to a given position along the corresponding rail 9, and the same boom 1 to be pivoted about the short pin 31 until it reaches a required lateral orientation with respect to the front-to-rear axis of the vehicle, if the two foot members 17, 19 are not moved to the same distance (compare FIGS. 3 and 4).

Thus, the first mounting means may be said to also include means for adjusting the lateral orientation of the primary boom 1 with respect to the front-to-rear axis of the vehicle.

In any event, it will be understood that lateral orientation of the primary boom 1 as shown in FIG. 4 will be possible only if the boom 1 is not tilted about its longitudinal axis 29, because each of the connecting and holding members have two degrees of freedom only. Similarly, tilting of the boom 1 as shown in FIG. 5 will only be possible if the boom 1 extends perpendicularly to the guiding rails 9, 11, as shown in FIG. 3.

Referring back to FIG. 1 the machine "M" also comprises a secondary lengthwise-extensible boom 51 having an extensible bottom end. This secondary boom is telescopic and includes an outer sleeve-shaped 53, an elongated inner member 55 slidably mounted within the outer member 53, and a power jack 57 to adjustably move the inner member with respect to the outer member.

Figure 6:
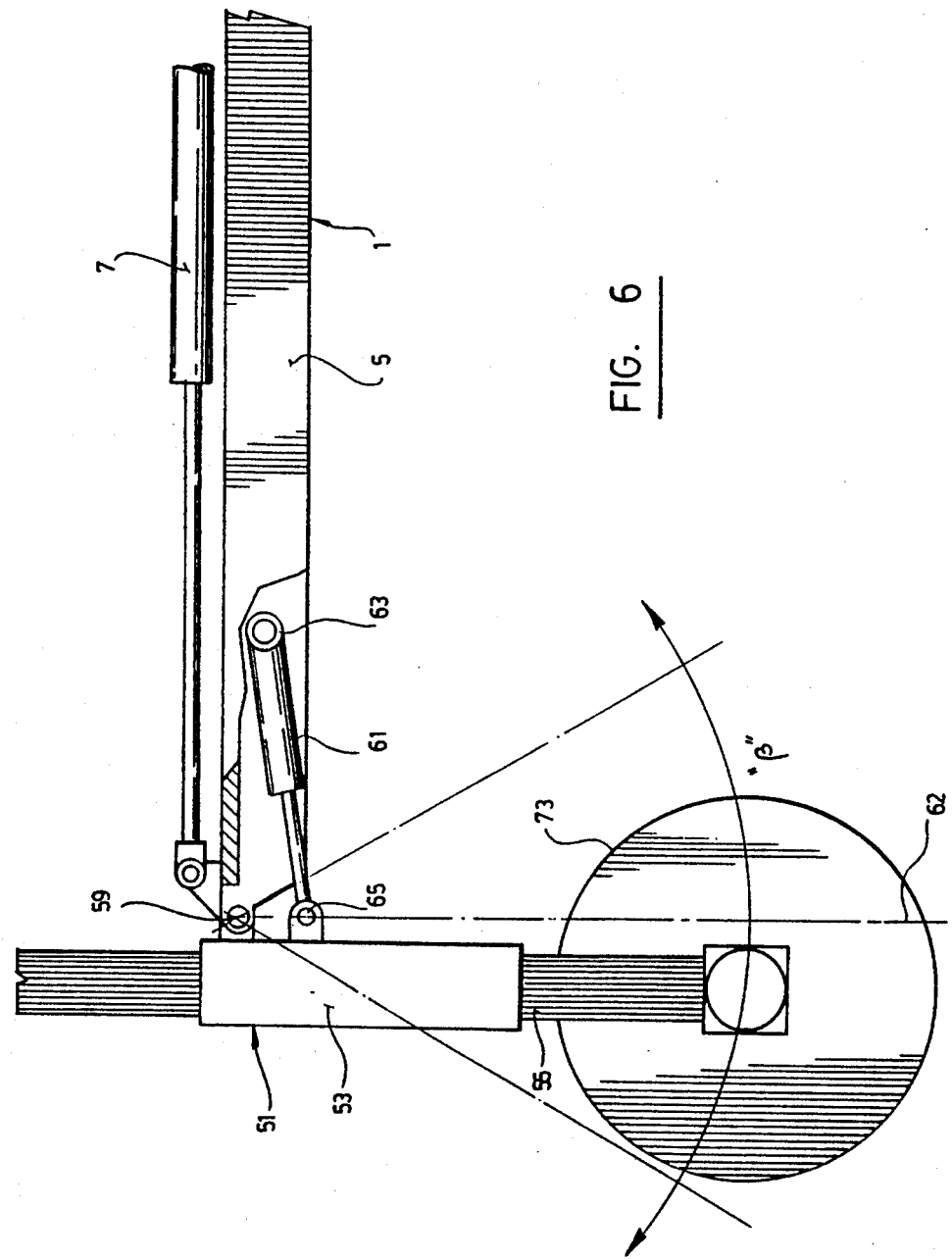
FIG. 6 is an elevational view of the secondary, boom connection to the primary boom, showing how the secondary boom may be tilted with respect to the primary boom.

Second mounting means are provided for mounting the secondary boom 51 on the extensible end of the primary boom 1 so that both of these booms 1, 51 extend in a same plane and the secondary boom is downwardly oriented and has its bottom end extensible downwardly, as is shown in FIGS. 1, 2 and 6.

These second mounting means include a pivot pin 59 connecting the inner member 5 of the primary boom 1 adjacent its extensible end, to the outer member 53 of the secondary boom 1. As clearly shown in the drawings, this pivot pin 59 extends transversally with respect to both of the booms 1, 51.

The second mounting means also includes means for adjustably tilting the secondary boom within the same plane as the primary boom 1, about the transversal axis defined by the pin 59.

These means for adjustably tilting the secondary boom 51 include a power jack 61 that is mounted within the inner member 5 of the primary boom 1 and has ends 63, 65 pivotably connected to the inner member 5 of the primary boom 1 and the outer member 53 of the secondary boom 51, respectively, away from the pivot pin 59, as is clearly shown in FIG. 6.

As also shown in FIG. 6, the power jack 61 has a stroke selected to tilt the secondary boom 51 about the pivot pin 59 at an angle $\beta$ of up to 45° in both direction with respect to an axis 62 perpendicular to the primary boom 5.

As better shown in FIGS. 1 and 3, mounting of the secondary boom 51 on the extensible end of the primary boom 1 is preferably achieved by means of a first pair of brackets 67 respectively secured to the lateral sides of the inner member 5 of the primary boom 1 so as to project longitudinally away from the extensible end of this primary boom, and by a second pair of brackets 69 secured to the outer member 5 of the secondary boom so as to project transversally away from the secondary boom 51. These two pairs of brackets are sized and positioned to interfit and be joined by the pivot pin 59.

The machine "M" further comprises a rotary, concrete-cutting saw assembly 71 mounted at the bottom end of the secondary boom 51. This assembly 71 includes a saw blade 73 that is oriented in such a manner as to extend parallel to the plane in which the primary and secondary booms 1,51 extend.

This saw assembly 71 is preferably mounted to the secondary boom in such a manner as to be easily detachable and replaceable by a core drilling assembly 75 as shown in FIG. 10. This feature may be useful to drill holes into the concrete blocks "B" in order to insert traffic sign posts, or to lift loads in which the bit of the drill may be screwed.

Preferably, the saw and drill assemblies as well as all the power jacks of the machine are selected to be hydraulically actuable from the truck-like vehicle V.

As shown in FIG. 9, the saw assembly 71 may include a protecting hood 77 that is freely mounted about a pivot 79 extending parallel to the axis of the saw blade 73 just above this blade in such a manner as to be automatically tilted by the block "B" while this block is being cut, and thus reach a position shown in dotted lines in FIG. 9, where it extends laterally at angle above the saw blade 73 and restrain splash and other projections generated by this saw blade.

In use, the machine according to the invention can be moved by its supporting truck "V" along the block or barrier "B" to be cut as is shown in FIG. 1.

After parking of the vehicle adjacent the barrier, the rotary saw blade 73 that extends in a plane that is transversal to the front-to-rear axis of the vehicle "V", may be longitudinally positioned by actuating the power jacks 21 and 23 to slide the boom 1 until it reaches the desired position. Then, the saw blade 73 may be laterally moved away from the vehicle toward the barrier to be cut by actuating the power jack 7 of the primary boom 1, until it extends above the barrier as shown in FIG. 8. The saw blade 73 may be then moved downwardly toward the barrier "B" to cut the same, by actuating the power jack 57 of the secondary boom 51. Cutting can be made on both sides of the barrier as shown in FIG. 8, if this barrier is wide.

If desired, the saw blade 73 may be tilted at angle either in the transversal plane in which it extends or with respect to a vertical plane, in order, for example, to cut at angle the end of the barrier (see FIG. 5 and cutting line Z in FIG. 1). The saw blade may also be vertically oriented at angle with respect to the front-to-rear axis of the vehicle, to make vertical cuts at angle in the barrier whenever desired (see FIG. 4 and cutting line Z' in FIG. 1).

Therefore, the saw blade 73 has several degrees of freedom that makes it easily adaptable to any kind of barrier "B" and cuts that may be needed. Moreover, the blade 73 can be positioned and operated in a very fast manner from the vehicle, thereby making the cutting operation rather short in time.

What is claimed is:

1. A machine for cutting concrete block, especially continuously molded, highway dividing barriers of the New Jersey type, said machine being mounted on a support base forming part of a powered truck vehicle having a front-to-rear axis, and comprising:
   a) a primary lengthwise-extensible boom having a longitudinal axis and an extensible end;
   b) first mounting means for mounting said primary boom on the support base for said primary boom to extend horizontally laterally thereof, said first mounting means including means for adjustably tilting said primary boom about its longitudinal axis;
   c) a secondary lengthwise-extensible boom having an extensible bottom end;
   d) second mounting means for mounting the secondary boom on the extensible end of the primary boom so that said primary and secondary booms extend in a same plane and said secondary boom is downwardly oriented relative to the horizontally extending primary boom and has its bottom end extensible downwardly, said second mounting means including means for adjustably tilting said secondary boom relative to said primary boom within said plane about an axis perpendicular to said plane; and
   e) a rotary, concrete-cutting saw assembly mounted at the bottom end of the secondary boom, said assembly including a saw blade extending parallel to the plane in which said primary and secondary booms extend,
   wherein said first mounting means also includes means for adjusting the lateral orientation of the primary boom with respect to the front-to-rear axis of the vehicle.

2. A machine for cutting concrete block, especially continuously molded, highway dividing barriers of the New Jersey type, said machine being mounted on a support base forming part of a powered truck vehicle having a front-to-rear axis, and comprising:
   a) a primary lengthwise-extensible boom having a longitudinal axis and an extensible end;
   b) first mounting means for mounting said primary boom on the support base for said primary boom to extend horizontally laterally thereof, said first mounting means including means for adjustably tilting said primary boom about its longitudinal axis;
   c) a secondary lengthwise-extensible boom having an extensible bottom end;
   d) second mounting means for mounting the secondary boom on the extensible end of the primary boom so that said primary and secondary booms extend in a same plane and said secondary boom is downwardly oriented relative to the horizontally extending primary boom and has its bottom end extensible downwardly, said second mounting means including means for adjustably tilting said secondary boom relative to said primary boom within said plane about an axis perpendicular to said plane; and
   e) a rotary, concrete-cutting saw assembly mounted at the bottom end of the secondary boom, said assembly including a saw blade extending parallel to the plane in which said primary and secondary booms extend, wherein said primary and secondary booms are both telescopic and each includes:

an outer member connected to said first or second mounting means;

an inner member slidably mounted within said outer member; and a power jack to adjustably move the inner member with respect to the outer member; and wherein said first mounting means comprises:

first and second guiding rails rigidly fixed to said base support, said first and second rails being spaced apart and extending parallel to said front-to-rear axis of the vehicle;

first and second primary boom carriers slidably mounted on said first and second rails, respectively;

first and second driving means to move said first and second carriers along said first and second rails, independently from each other;

connecting means pivotably mounted onto one of said first and second carriers about an axis parallel to said longitudinal axis, said connecting means being also pivotably connected to the outer member of said primary boom by means of a short pin perpendicular to said longitudinal axis;

holding means including a base member pivotably mounted onto the other one of said first and second carriers about another axis parallel to said longitudinal axis and a sleeve member in which said primary boom is slidably mounted, said sleeve member being pivotably mounted onto said base member about an axis perpendicular thereto; and power jack means mounted on said carriers to tilt said connecting and holding means together with the primary boom about said axes parallel to said longitudinal axis;

whereby proper adjustment of said first and second carriers along said first and second rials by proper actuation of said first and second driving means, respectively, also causes the one point of the primary boom connected to the connecting means to be slid to a given position along the corresponding rails and the primary boom to be pivoted about the short pin forming part of said connecting means in order to reach a required lateral orientation with respect to the front-to-rear axis of the vehicle.

3. The machine of claim 2, wherein said first and second driving means consist of power jacks.

4. The machine of claim 3, wherein said first and second carriers are each in the form of a vertical post having a foot member slidably mounted onto the corresponding rail.

5. The machine of claim 4, wherein said power jack means extends from said foot members up to said connecting and holding means, and have a stroke selected to adjustably tilt the primary boom up to 25° in both directions about said longitudinal axis.

6. A machine for cutting concrete block, especially continuously molded, highway dividing barriers of the New Jersey type, said machine being mounted on a support base forming part of a powered truck vehicle having a front-to-rear axis, and comprising:

a) a primary lengthwise-extensible boom having a longitudinal axis and an extensible end;

b) first mounting means for mounting said primary boom on the support base for said primary boom to extend horizontally laterally thereof, said first mounting means including means for adjustably tilting said primary boom about its longitudinal axis;

c) a secondary lengthwise-extensible boom having an extensible bottom end;

d) second mounting means for mounting the secondary boom on the extensible end of the primary boom so that said primary and secondary booms extend in a same plane and said secondary boom is downwardly oriented relative to the horizontally extending primary boom and has its bottom end extensible downwardly said second mounting means including means for adjustably tilting said secondary boom relative to said primary boom within said plane about an axis perpendicular to said plane; and e) a rotary, concrete-cutting saw assembly mounted at the bottom end of the secondary boom, said assembly including a saw blade extending parallel to the plane in which said primary and secondary booms extend, wherein said primary and secondary booms are both telescopic and each includes:

an outer member connected to said first or second mounting means;

an inner member slidably mounted within said outer member; and a power jack to adjustably move the inner member with respect to the outer member; and wherein:

said second mounting means includes a pivot pin connecting the inert member of the primary boom adjacent the extensible end thereof to the outer member of the secondary boom, said pivot pin extending transversely with respect to both of said booms, and said means for adjustably tilting the secondary boom includes a power jack having ends pivotably connected to the inner member of the primary boom and the outer member of the secondary boom, respectively, away from said pivot pin.

7. The machine of claim 6, wherein:

said second mounting means further includes:

a first pair of brackets respectively secured to the lateral sides of the inner member of the primary boom so as to project longitudinally away from the extensible end of said primary boom; and a second pair of brackets secured to the outer member of the secondary boom so as to project transversally away from said secondary boom;

said first and second pairs of brackets being sized and positioned to interfit and be joined by said pivot pin, and said power jack forming said means for adjustably tilting said secondary boom is mounted within the inner member of the primary boom.

8. The machine of claim 7, wherein said power jack forming said means for adjustably tilting said secondary boom has a stroke selected to tilt the secondary boom about said pivot pin up to 45° in both directions with respect to an axis perpendicular to the primary boom.

9. The machine of claim 4, wherein:

said second mounting means includes a pivot pin connecting the inner member of the primary boom adjacent the extensible end thereof to the outer member of the secondary boom, said pivot pin extending transversally with respect to both of said booms, and said means for adjustably tilting the secondary boom includes a power jack having ends pivotably connected to the inner member of the primary boom and the outer member of the secondary boom, respectively, away from said pivot pin.

10. The machine of claim 8, wherein:

said second mounting means further includes:
- a first pair of brackets respectively secured to the lateral sides of the inner member of the primary boom so as to project longitudinally away from the extensible end of said primary boom; and
- a second pair of brackets secured to the outer member of the secondary boom so as to project transversally away from said secondary boom;

said first and second pairs of brackets being sized and positioned to interfit and be joined by said pivot pin, and said power jack forming said means for adjustably tilting said secondary boom is mounted within the inner member of the primary boom.

11. The machine of claim 10, wherein said saw assembly is detachable and replaceable by a core drilling assembly.

12. The machine of claim 11, wherein said saw or drill assemblies as well as all the power jacks of said machine are hydraulically operated by said truck-like vehicle.

13. The machine of claim 1, wherein said saw assembly is detachable and replaceable by a drill assembly.

14. The machine of claim 1, wherein said saw assembly also includes a protecting hood that is freely mounted about a pivot extending parallel to the axis of said saw blade just above said blade in such a manner as to be automatically tilted by the block while it is being cut, and reach a position where it extends laterally at angle above said saw blade and restrain splash and other projections generated by said saw blade.

15. The machine of claim 10, wherein said saw assembly also includes a protecting hood that is freely mounted about a pivot extending parallel to the axis of said saw blade just above said blade in such a manner as to be automatically tilted by the block while it is being cut, and reach a position where it extends laterally at angle above said saw blade and restrain splash and other projections generated by said saw blade.

* * * * *